United States Patent [19]

White

[11] Patent Number: 4,502,655
[45] Date of Patent: Mar. 5, 1985

[54] TELEPHONE MOUNTING BRACKET FOR MOBILE HOME

[75] Inventor: Frank T. White, Rockaway, N.J.

[73] Assignee: AT&T Technologies, Inc., New York, N.Y.

[21] Appl. No.: 542,301

[22] Filed: Oct. 14, 1983

[51] Int. Cl.³ .............................................. A47B 96/06
[52] U.S. Cl. .................................................... 248/228
[58] Field of Search ............... 248/228, 241, 278, 293, 248/291, 220.4; 52/36

[56] References Cited

U.S. PATENT DOCUMENTS

| | | | |
|---|---|---|---|
| 2,038,143 | 4/1936 | Swanson | 248/240.4 |
| 2,628,807 | 2/1953 | Lincoln | 248/291 |
| 2,636,549 | 4/1953 | Geller | 248/240.4 |
| 2,782,483 | 2/1957 | De Canio | 248/291 |
| 2,850,567 | 9/1958 | Bauman et al. | 248/240.4 |
| 3,122,347 | 2/1964 | Robinson et al. | 248/228 |
| 3,561,717 | 2/1971 | Frederick | 248/228 |
| 4,333,575 | 6/1982 | Wong | 248/293 |

Primary Examiner—William H. Schultz
Assistant Examiner—Ramon O. Ramirez
Attorney, Agent, or Firm—R. F. Kip, Jr.

[57] ABSTRACT

The disclosed bracket is attachable to an outrigger of a mobile home and is adapted to mount a service closure containing the protector device in a telephone lead-in connection to the home. The bracket comprises: a longitudinally extending base securable by beam clamps to a flange on the outrigger, a longitudinally extending plate disposed transversely to one side of the base and adapted to have the service closure mounted therein, an adjustable length strut means pivotally connected at opposite ends to longitudinally central parts of, respectively, the base and the plate, and first and second base-to-plate fastening means providing alternatively usable first and second pivotal couplings of the base and plate at locations longitudinally spaced from and on opposite sides of the couplings of such strut means to these elements. By virtue of the bracket having such construction, its plate may be secured to its base in either a left handed or a right handed relation with the plate making with the base any desired angle within a good sized range.

8 Claims, 6 Drawing Figures

TELEPHONE MOUNTING BRACKET FOR MOBILE HOME

FIELD OF THE INVENTION

This invention relates generally to brackets adapted, when secured to a support, to mount one or more objects. More particularly, this invention relates to brackets of such kind which are well adapted to mount outside a mobile home certain of the telephone equipment included in a telephone lead-in conection to the home.

BACKGROUND OF THE INVENTION

Communication between the telephone network and the telephone equipment in a home is commonly provided by a telephone lead-in connection comprising (a) a service wire extending to the home from a telephone feeder cable carried by poles or buried underground, (b) a connector block coupling the conductors of the service wire to appropriate conductors of the cable, (c) inside wiring extending in the home from the telephone equipment therein to the near end of the service wire, (d) a component having terminals for connecting the conductors of the service wire to the conductors of the inside wiring and (e) a box-like enclosure (commonly known as a "service closure") which contains such component and its terminals, and which is mounted inside or outside the home on a support structure, the service closure having a cover permitting access to its interior. The mentioned component may be either a connector block or a protector, i.e., a device adapted not only to make the connections between the service wire and the inside wiring but, also, to protect the telephone equipment in the home from excessive current in the feeder cable by shunting the excess current to ground. A protector is installed in the service closure when there is no protector device installed at the feeder cable for performing such current limiting function.

In the case of a conventional home, the mounting of the service closure usually can be done with little or no difficulty by drilling holes in the home's wooden siding or other wooden part of the home's structure, and by fastening the closure to that siding or part by passing screws or bolts into such holes.

In the case, however, of a mobile home, a number of problems have been encountered in providing a suitable mounting of the service closure. One such problem is that the walls of the living compartment of the home are usually provided by a sheet metal exterior backed by spaced narrow-width wooden studs which are in turn covered on the inside by sheets of plaster board or the like. With such construction of the living compartment walls the installer of the service closure has the choice of fastening the closure solely to the sheet metal by sheet metal screws which often do not provide a reliable mounting or, alternatively, fastening the closure to the studs which, however, are concealed and, thus, difficult to find. Further, in either case in drilling the holes, the installer runs a substantial risk of inadvertently drilling into a utility fixture contained in the wall such as, for example, an electrical power cable or a plumbing fixture.

As another such problem encountered heretofore in the mounting of service closures for mobile homes, the closure is preferably mounted low-down to minimize the length of exposed service wire running between the closure and a pedestal upstanding from the ground from which the service wire exits, and through which that wire is connected to a buried telephone feeder cable. When, however, the closure is so mounted low-down on the outside of the home, it often is later covered by a skirting placed around the lower part of the home so that the closure becomes difficult to locate and access if it is necessary to service the connections made within the closure.

SUMMARY OF THE INVENTION

These and other problems may be overcome or lessened according to the invention by providing a mounting bracket according thereto and comprising: a longitudinally extending base for the bracket, attaching means for fixedly securing such base to support means for the bracket, a longitudinally-extending angularly-tiltable mounting plate disposed to be transversely on one side of such base, strut means pivotally coupled at its opposite ends to, respectively, a longitudinally central part of such base and a longitudinally central part of such plate, and first and second base-to-plate fastening means providing two selectively detachable pivot connections disposed leftward and rightward, respectively, of said strut means and made between parts of said base and plate which are spaced from said central parts thereof. By using one or the other of such detachable pivot connections, the mounting plate may be pivotally coupled left- or right-handedly to the base, with the base, plate and strut means forming in each case a structurally stable triangular structure. The described bracket is well adapted for being secured to the usual undercarriage of a mobile home to provide for such home a mounting for the service closure (and its contained components) included in the telephone lead-in connection for that home. Such bracket is, however, not limited to that application but, rather, may be used for other applications and to mount one or more objects other than a service closure and components contained thereby.

BRIEF DESCRIPTION OF THE DRAWINGS

For a better understanding of the invention, reference is made to the following description of an exemplary embodiment thereof and to the accompanying drawings wherein.

STRUCTURE OF EMBODIMENT

Figure 1:
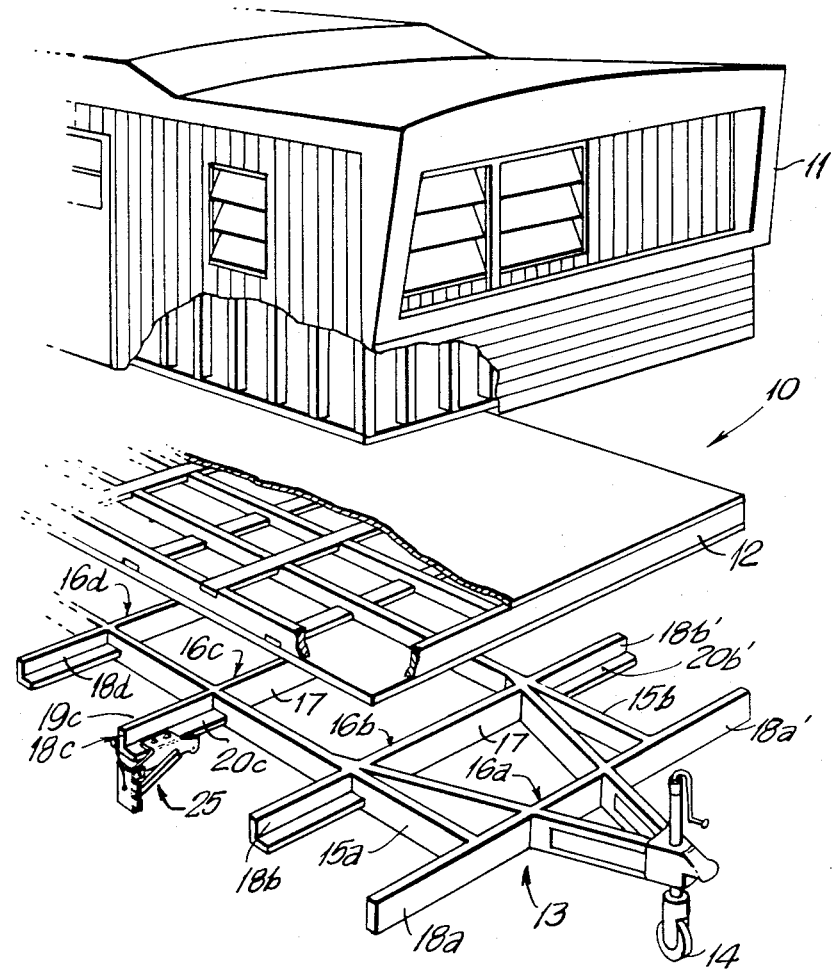
FIG. 1 is an isometric exploded view of part of a mobile home having attached thereto a mounting bracket constituting the exemplary embodiment.

Referring now to FIG. 1, the reference numeral 10 designates a mobile home comprising a living compartment 11, a floor platform 12 for such compartment and a steel undercarriage 13 beneath such floor and supported above the ground by a front wheel 14 and by two pairs of rear wheels (not shown) disposed towards the back of the undercarriage on opposite sides thereof. Undercarriage 13 is in the form of a frame comprising two spaced parallel lengthwise-running steel beams 15a, 15b and a plurality of spaced parallel crosswise-running beams 16a, 16b, etc. having central portions 17 between beams 15 and end portions 18a, 18b, etc. and 18a', 18b', etc. which project outward to either side of beams 15 and which are known as "outriggers." As shown, the outriggers 18b, 18c . . . behind the front cross beam 16a are "L" channel members having vertical web portions 19 and elongated flange portions 20 integrally joined with webs 19 to project outward from the lower edges thereof. In the construction shown in FIG. 1, the webs 19 of the outriggers 18 are generally rectangular in shape such that flanges 20 extend horizontally outward in parallel relation to the ground. As later described, however, there are other constructions for undercarriage 13 in which the outrigger flanges 20 slant upwardly outward so as to be at an angle to the ground.

Figure 3:
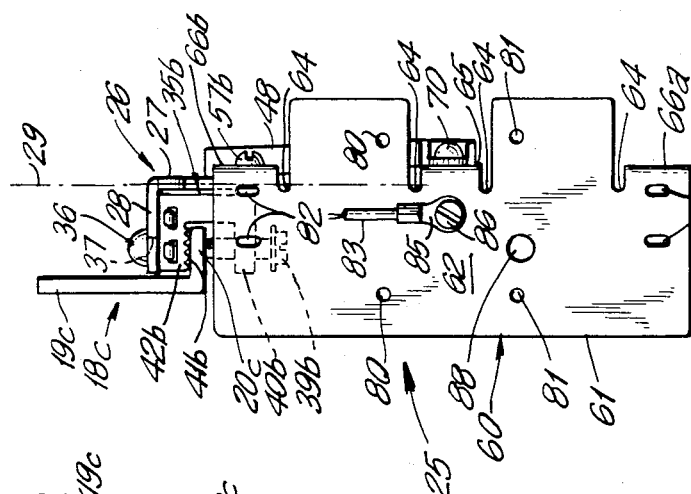
FIG. 3 is a left side elevation of the FIG. 2 bracket and outrigger portion.
Figure 2:
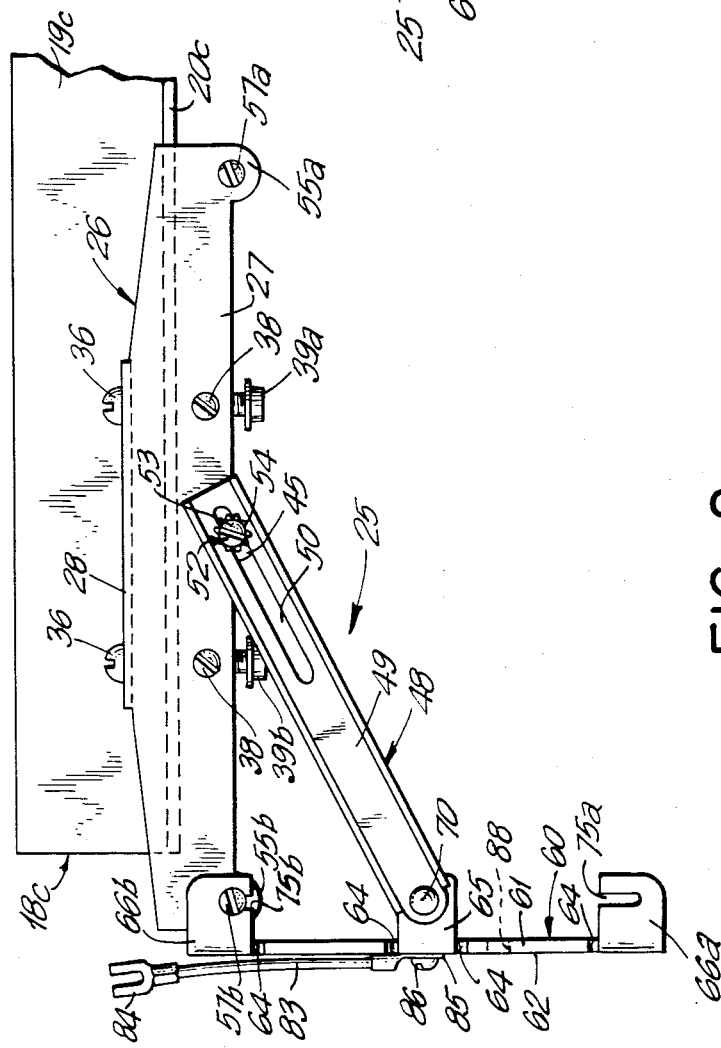
FIG. 2 is a front elevation of the FIG. 1 bracket and of a portion of an outrigger to which such bracket is secured.
Figures 4, 5:
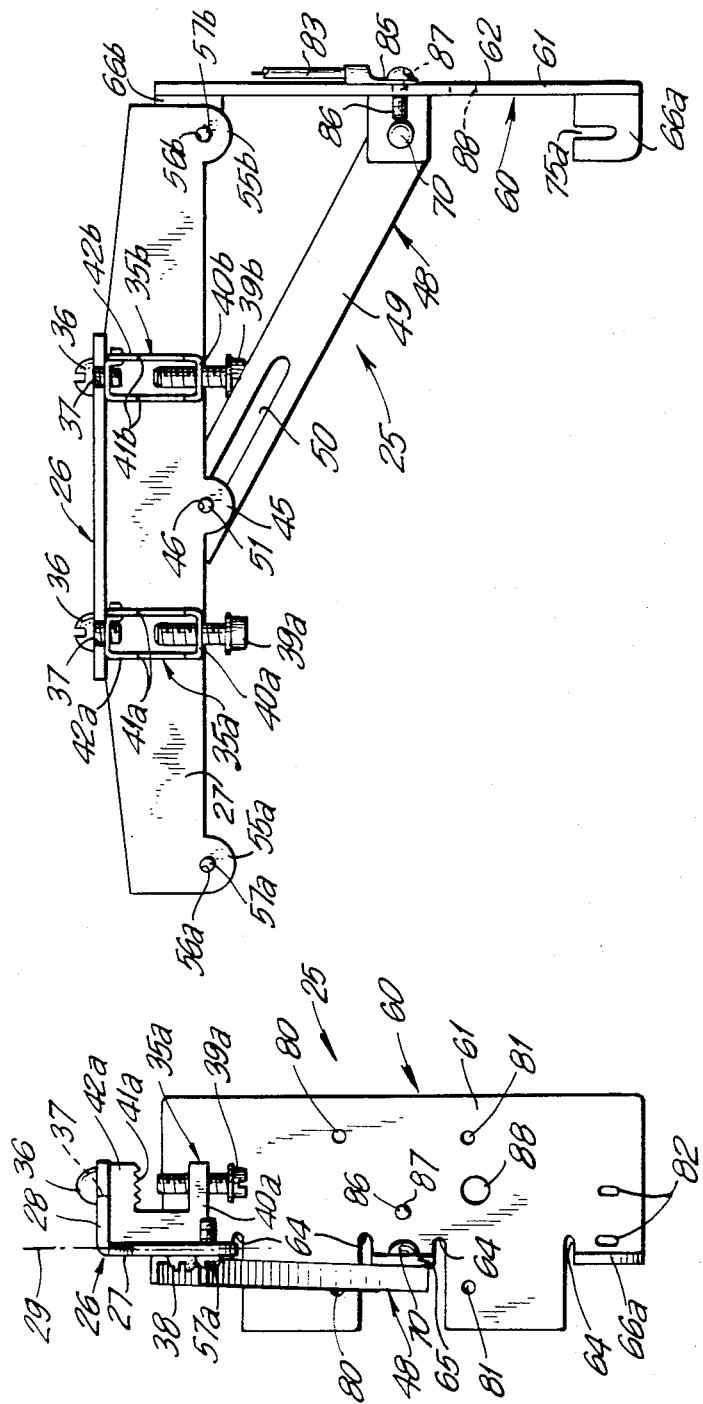
FIG. 4 is a right side elevation of the FIG. 2 bracket when detached from said outrigger portion.
FIG. 5 is a rear elevation of the FIG. 2 bracket when detached from the outrigger.

Secured to, say, the outrigger 18c is a mounting bracket 25 according to the invention and shown in more detail in FIGS. 2–5. Referring to those latter figures, bracket 25 comprises a longitudinally extending base 26 including as integral parts thereof a longitudinally elongated web 27 and a flange 28 projecting rearwardly from the web's upper side over the length of a central portion of the web so that, over that length, the base 26 is of "L" cross section. Web 27 defines a longitudinal-transverse plane 29 which is vertical when bracket 25 is secured to outrigger 18c as shown in FIGS. 2 and 3.

Disposed on the back of web 27 on the inside of the "L" cross-sectioned portion of base 26 are a pair of longitudinally spaced beam clamps 35a, 35b (FIG. 5) which are not themselves part of the invention, but which can be purchased from Erico Products, Inc., Cleveland, Ohio and are identified by that Company as a "Caddy Fastener, Cat. No. BC." Clamps 35 are removably fastened to base 26 by, on the one hand, screws 36 passing down through notches 37 in the back edge of flange 28 to enter into threaded holes (not shown) in the tops of the clamps, and by, on the other hand, screws 38 (FIG. 2) passing horizontally through apertures in web 27 into threaded holes in the sides of the clamps which face that web. The clamps 35a, 35b have respective set screws 39a, 39b passing vertically through threaded holes formed in horizontal lower shoulders 40a, 40b (FIGS. 4 and 5) of the clamps so that the free upper ends of such screws are selectively advanceable towards, and retractable from, jaws 41a, 41b formed on the lower sides of upper shoulders 42a, 42b constituting parts of such clamps.

Web 27 has (as a longitudinally central part) a boss 45 projecting downward from the web's lower edge and having a threaded aperture 46 (FIG. 5) formed therein. Registering with boss 45 is the upper end of an adjustable length strut means of which a part is an elongated bar 48 of rectangular "C" shape in cross section and having formed in its central web 49 a slot 50 extending in the bar's direction of elongation. Passing through such slot into the threaded aperture 46 of boss 45 is the stem 51 of a locking screw 52 having on the outer side of web portion 49 a head 53 which is larger in diameter than the width of slot 50, and which is separated from such outer side by a lock washer 54. When locking screw 52 is loose, bar 48 is pivotable about screw 52 to be angularly movable in the longitudinal-transverse plane 29. Moreover, with screw 52 being loose, the distance between that screw and the lower end of bar 48 is freely adjustable to thereby provide the adjustable length feature of the mentioned adjustable length strut means. By, however, tightening screw 52, bar 48 may be drawn against the web 27 of base 26 so that the bar is neither able to pivot about screw 52 nor undergo with respect thereto any shift changing the distance between such screw and the bar's lower end.

The base 26 inlcudes not only longitudinal central boss 45 but also two additional bosses 55a and 55b longitudinally spaced from and on opposite sides of boss 45 and, like it, projecting downward from the lower edge of the web 27. Bosses 55a and 55b have formed therein respective threaded holes 56a, 56b through which pass respective pin means in the form of screws 57a and 57b. The function of the bosses 55 and the screws 57 will be later explained.

Disposed beneath base 26 is a generally rectangular mounting plate 60 mostly constituted of a flat or planar sheet 61 having a mounting surface 62 on its outside and extending in its two major dimensions in (a) the longitudinal direction and (b) the direction normal to plane 29. In such connection, the term longitudinal is used herein in respect of plate 60 to refer to the coordinate of the plate which is parallel to the longitudinal coordinate of base 26 when the plate is coupled to the base only through bar 48 and is not angularly tilted with respect to the base.

As stated, mounting plate 60 is mostly constituted of the flat mounting sheet 61. At the front, however, of the plate, four laterally spaced cut-out slots 64 extend into the plate to permit a laterally central part thereof and its two lateral ends to be bent into a center tab 65 and two other tabs 66a and 66b laterally spaced from and on opposite sides of tab 65. All three tabs project outward from sheet 61 at right angles thereto, and all three tabs lie in a common plane parallel to plane 29.

As well shown in FIG. 2, the center tab 65 of plate 60 is pivotally connected to the lower end of bar 48 by a pivot pin constituted of a rivet 70 passing through apertures in such lower end and in tab 65 to permanently connect bar 48 on plate 60 so that the plate is freely pivotable about the bar. At the same time, the rivet holds the bar close to the tab so that, at their greatest possible separation, there is very little clearance between the surfaces facing each other of the web portion 49 of the bar and of the tab 65 of the plate. It follows that, except for the small degree of play between bar 48 and plate 60 permitted by that small clearance, the plane of the mounting sheet 61 of the plate will be maintained normal to the plane in which bar 48 moves as it pivots around pivot pin 70.

Turning now to the other plate tabs 66a and 66b, these tabs have therein respective apertures in the form of notches 75a, 75b extending thereinto from the longitudinally inward sides of such tabs. As shown, notches 75 are parallel to the lie of the mounting sheet 61 of plate 60. The widths of such notches are greater and lesser than the diameters of, respectively, the stems and the heads of the screws 57 carried by the base 26. By virtue of having notch 75b therein, tab 66b is adapted to form with boss 55b and screw 57b a first base-to-plate fastening means providing a selectively detachable pivotal coupling of the base 26 and the mounting plate 60 such that the plate is coupled left-handedly to the base. Similarly, by virtue of having notch 75a therein, tab 66a is adapted to form with boss 55a and screw 57a a second base-to-plate fastening means providing another selectively detachable pivotal coupling of base 26 and plate 60 which joins the plate right-handedly to the base, and which is usable alternatively with the mentioned first fastening means.

For purposes of affixing the mentioned service closure to the mounting sheet 61 of plate 60, that plate has formed therein first and second pairs of apertures 80 and 81 alternatively used to mount the closure on surface 62 when the plate is coupled left- and right-handedly, respectively, to base 26. Screws (not shown) are passed through such apertures to secure the service closure on the plate. Mounting sheet 61 also has formed therein some slot-holes 82 disposed at longitudinally opposite ends of the sheet and permitting connection of the plate 60 to tie wraps for purposes of strain relief. A further feature of plate 60 is that it carries on its mounting surface 62 (FIGS. 2 and 3) an insulated wire 83 having at its upper end a spade terminal 84 and connected at its lower end to the metal of bracket 25 by a lower terminal 85 held in pressure contact with the mounting surface 62 of the plate by a screw 86 passing through an aperture in such terminal and into a threaded hole 87 in such plate. Wire 83 is used when a protector is included in a service closure mounted on bracket 25. Plate 60 has also formed therein a hole 88 permitting passage therethrough of the inside wiring for the mobile home.

Figure 6:
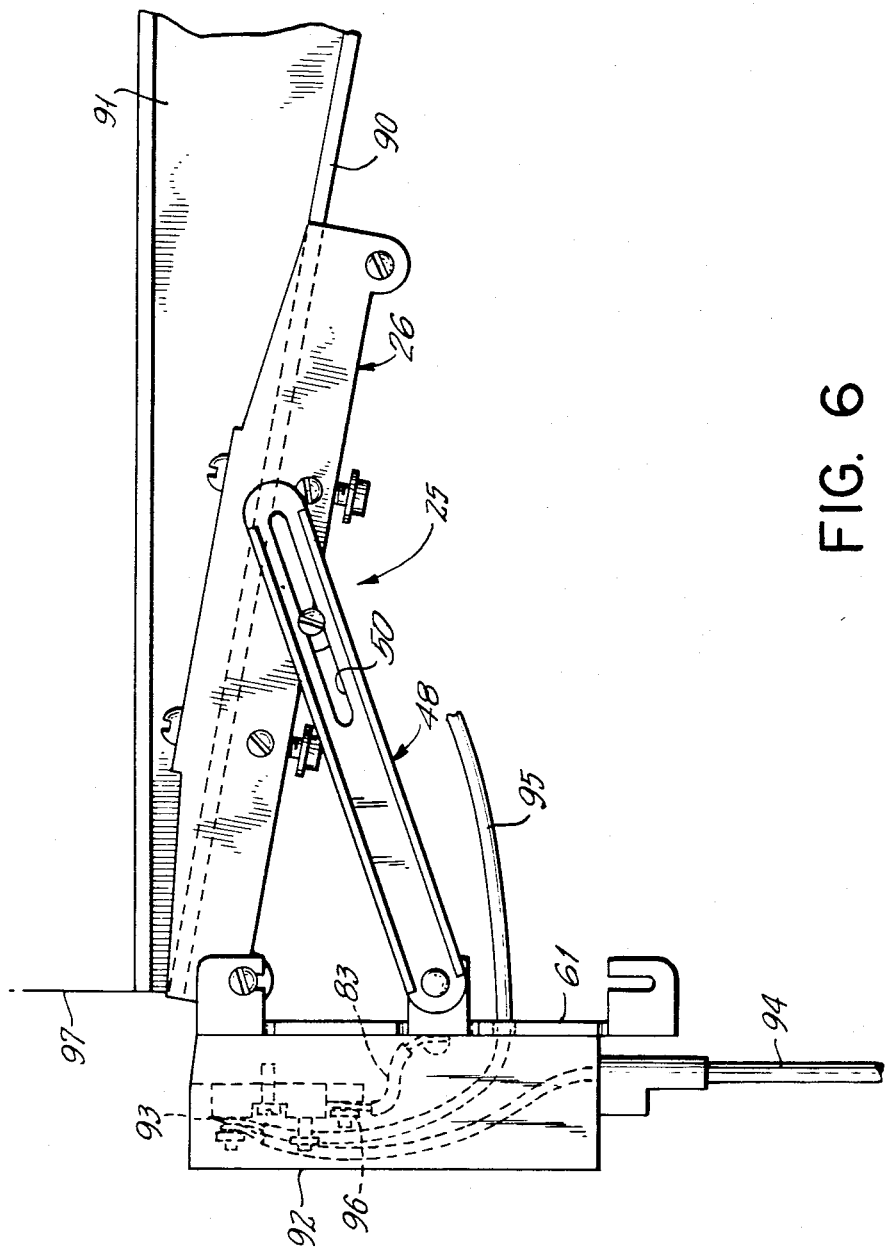
FIG. 6 is a front elevation of the FIG. 2 bracket when a service closure is mounted thereon; and the bracket is secured to an outrigger having a slanted flange.

FIG. 6 shows the bracket 25 when clamped to the upwardly slanting flange 90 of a left-hand mobile home outrigger 91 and when, moreover, there is mounted on bracket 25 a service closure 92 enclosing a protector 93 forming part of the telephone lead-in connection. As depicted in FIG. 6, the service wire 94 and inside wire 95 for such connection are both coupled to protector 93, the ground post 96 of which is coupled via wire 83 to the metal of bracket 25. The mounting sheet 61 of bracket 25 is illustrated (FIG. 6) as being positioned parallel to the siding 97 of mobile home 10, such position being the preferred one for sheet 61 whether the terrain under the mobile home is flat or somewhat sloping.

OPERATION AND USE

Assume to begin with that the location of mobile home 10 (FIG. 1) is such that its outrigger 18c is nearest to the service wire assigned for use for the telephone in-line connection to be made to the home. Assume further that, initially, bracket 25 is nearby with its plate 60 coupled to its base 26 only through bar 48 and screw 52 which is then loose. In such case and as part of making the telephone in-line connection, the mounting bracket 25 is installed on outrigger 18c in a manner as follows:

With the set screws 39 of the beam clamps 35 being retracted away from their jaws 41 far enough for the horizontal flange 20c of the outrigger to fit in between such screws and jaws, the bracket 25 is manipulated to place flange 20c between those elements, and screws 39 are then tightened to fixedly secure the base 26 of the bracket to flange 20c. Next, since outrigger 18c is on the left side of mobile home 10, plate 60 of the bracket is positioned to cause insertion in the slot 75b (of the left-hand tab 66b of plate 60) of the stem of the screw 57b carried in the threaded hole 56b in the left-hand boss 55b on base 26. At this point, plate 60 is pivotally coupled left-handedly to base 26 through the first base-to-plate fastening means comprising tab 66b, screw 57b and boss 55b. Since, however, both screws 57b and 52 are still loose, plate 60 may be pivoted about pin means 57b to angularly move in plane 29 to any angular position (in a range) in relation to base 26, with corresponding adjustment taking place along bar 48 in the distance between screw 52 and rivet 70. When the plate has reached the desired angular position (which is usually, but not necessarily, that position in which the mounting sheet 61 of the plate is perpendicular to the terrain on which the wheels of the mobile home rest), the plate 60 is locked in that position by tightening of the screws 57b and 52. The tightening of screw 57b draws tab 66b into flush pressure contact with boss 55b on web 27 and other area on the front surface of such web so that plate 60 becomes (at the mentioned first fastening means) restrained both from further pivoting about screw 57b in plane 29 and from angular play relative to base 26 in the plane defined by the mounting sheet 61 of the plate. Similarly, the tightening of screw 52 advances lock washer 54 into pressure contact with the web portion 49 of bar 48, and, by that advancement, causes the back side of bar 48 to be forced into flush pressure contact with boss 45 (and other area of the front surface of web 27) so that bar 48 becomes locked in the sense of being constrained from undergoing (a) further pivoting of the bar about screw 52 in plane 29, (b) angular play of the bar relative to base 26 in the plane passing through the centerline of bar 48 normal to the web portion 49, and (c) further change in the distance between screw 52 and pivot pin 70. Such fixing of the positioning of bar 48 in turn tends to further stabilize the fixing of the positioning of plate 60 by the tightening of screw 57b. With the distance between screw 52 and pivot pin 70 being fixed as described, the left-hand side of base 26, the left-hand side of plate 60 and the part of bar 48 between elements 52 and 70 form in plane 29 a triangle which, as is well known, is structurally stable in that it is a "rigid" geometric configuration. Further, because of the flush pressure contacts between bar 48 and base 26, and between plate 60 and base 26 at the first base-to-plate fastening means, the plate 60 is restrained from any substantial angular play in the plane defined by its mounting sheet 61.

It follows from the considerations just discussed, and from the fixed securing by beam clamps 35 of bracket 25 to flange 20c of outrigger 18c of mobile home 10, that the mounting sheet 61 will provide for a service closure (or other object) to be affixed thereto a platform which will be highly stable in position in relation to the structure of home 10.

It may be that, instead of the service wire of the telphone-in-line installation being on the left-hand side of home 10 as described above, such wire is on the right-hand side of such home and near, say, the right-hand outrigger 18b' of such home. In that case, bracket 25 may be installed on the horizontal flange 20b' of such outrigger by following the same procedure as that previously described, excepting that the second base-to-plate fastening means comprising tab 66a, screw 57a and boss 55a is utilized (in lieu of the first base-to-plate fastening means) to couple the right-hand end of plate 60 to the right-hand end of base 26. Mounting bracket 25 is thus versatile in that its mounting plate can be coupled either left- or right-handedly to its base 26 so as to provide for easy installation of a telephone in-line connection to either the left or right side of home 10.

As so far described, bar 48 need not provide a strut means of adjustable length in the sense that change can be made in the distance between the connections of the bar to, respectively, base 26 and plate 60. That is, slot 50 can be replaced by a simple hole through which screw 52 passes, and which fixes the distance between that screw and pivot pin 70 at a value rendering plate 60 at a right angle to base 26. In, however, many constructions of mobile homes, the flanges of their outriggers are not horizontal as shown in FIG. 1 but, rather (and as shown in FIG. 6), slant upwardly as such flanges extend outwards from the lengthwise running beams 15 of the undercarriage 13 of the home. For such constructions with such upwardly slanting flanges, to include in bracket 25 the feature of the described adjustable length of the strut means is advantageous because it permits plate 60 to be fixed in an angular position which can be within a range of angles to base 26 of from 45 degrees to 90 degrees, and which, thus, can usually be made (as ordinarily preferred) parallel to the siding of the mobile home for any angle of slant (within a reasonable range) of the flange of the home's outrigger to which the bracket is secured. Of course, the range of angles assumable by plate 60 in relation to base 26 can be made even larger than from 45 to 90 degrees by lengthening slot 50 (or both such slot and the bar 48) beyond what is shown herein. To have, however, the described adjustability of the angle of plate 60 to base 26 lie in the range from and including 45 degrees to and including 90 degrees is considered optimum since that range will permit plate 60 to be parallel to the siding of the home for all known angles of slant of the flanges of outriggers now incorporated in the structures of mobile homes while, at the same time, avoiding the substantial projection of the upper end of bar 48 above base 26 which might occur (depending on the vertical width of the base between its top and the aperture for pin 52) if the range were larger.

One or both of the two notches 75 in the two end tabs 66 of plate 60 can, of course, be replaced by an aperture closed all around for passage through the tab of the corresponding screw 57 carried by the base 26. To use the described notches in lieu of such apertures provides the advantage, however, that either one of the two described base-to-plate pivotal couplings can be established and terminated without the effort of removing from, and later reinserting into, base 26 a screw 57, and without running the risk in the course of so doing, of inadvertent loss of such screw. The same advantage can be obtained if the notched tabs 66 on plate 60 are transposed with the apertured bosses 55 on the base 26, the screws 57 not being carried on plate 60 by the transposed bosses.

Some advantages of the described bracket 25 in addition to those already mentioned are as follows. Since the bracket is securable to the undercarriage of the mobile home by a clamping action, there is no need to drill holes in the structure of the home and thereby run the risks attendant on such drilling that a firm support for the bracket will not be found or that a utility fixture for the mobile home will be hit by the drilling tool. Since the bracket is secured to the undercarriage of the home, it will not be concealed by a decorative skirting placed thereon and, accordingly, will be easily locatable and accessible in case the connections inside the service closure on the bracket require servicing.

Some mobile homes employ as a main support beam a lengthwise running "C" beam of which the central web is vertical and its two flanges are horizontal. In that case, the bracket 25 can be mounted upside down in respect of such beam with the bracket's base 26 being clamped to the beam's lower flange and the plate 60 being positioned within the space between the beam's two flanges and separated far enough from the upper flange that the service closure can be mounted on the plate without touching the upper flange. Further, beam clamps 35 are removable from base 26 to permit securing the bracket 25 to a wooden floor beam of a home 10 in case steel outriggers are inaccessible for securing the bracket to the home. Because the bracket consists of only three major parts (namely base 26, bar 48 and plate 60) of which each can be made of appropriately stamped, bent and otherwise worked sheet metal, the bracket is simple in construction and easy and inexpensive to manufacture. Where the service closure mounted on the bracket includes a protector, that device may be easily connected to ground through wire 83, the metal of the bracket, the metal of the mobile home's undercarriage to which the bracket is electrochemically secured, and a grounding of such undercarriage.

The above-described embodiment of the invention being exemplary only, additions thereto, omissions therefrom and modifications thereof can be made without departing from the spirit of the invention. Accordingly, the invention is not to be considered as limited save as is consonant with the recitals of the following claims.

What is claimed is:

1. An object mounting bracket comprising: a longitudinally extending base for said bracket, attaching means for fixedly securing said base to support means for said bracket, strut means coupled at one of its ends to a longitudinally central part of said base by a first pivot connection about which said strut means is angularly movable in a longitudinal-transverse plane, a longitudinally extending angularly tiltable mounting plate for an object to be supported by said bracket, said plate providing a mounting surface normal to said plane and having a longitudinally central part of said plate coupled to the other end of said strut means by a second pivot connection at which such central part of said plate is maintained by said strut means in transversely spaced relation from said base, and first and second base-to-plate fastening means providing selectably detachable, third and fourth, pivot connections between, respectively, (a) portions respective to said base and plate which are leftwardly spaced longitudinally from, respectively, said first and second pivot connections, and (b) portions respective to said base and plate which are rightwardly spaced longitudinally from, respectively, said first and second connections, said first and second fastening means enabling said plate to be selectably fastened left- and right-handedly to said base with said base, plate and strut means forming in each case a structurally stable triangular configuration.

2. A bracket according to claim 1 in which said base is at least partly of "L" shape in cross section normal to said plane, said support means for said bracket is in the form of a flange, and said attaching means comprises a pair of beam clamps mounted on the inside of said base in relation to said "L" shaped cross section and adapted to fixedly secure said base to said flange.

3. Bracket according to claim 1 in which said strut means is adjustable in length.

4. A bracket according to claim 3 in which said adjustable length strut means comprises: an elongated bar having formed therein at one of its ends a slot extending in the bar's elongation direction, a pivot pin permanently coupling the other end of said bar to said central part of said plate, and a screw with a head of greater diameter than the width of said slot, and with, also, a stem passing through said slot into said central part of said base, said screw while loose permitting pivoting of said bar about said stem and adjustment of the distance between said screw and pin, and said screw being tightenable to force said bar against said base so as to couple said bar and base in fixed relation.

5. A bracket according to claim 4 in which mounting plate comprises a flat sheet disposed normal to said plane and having said mounting surface on the outside thereof, said plate also comprising a center tab projecting from said sheet towards said base and constituting said plate's central part which is coupled by said pivot pin to said bar.

6. A bracket according to claim 1 in which said mounting plate comprises a flat mounting sheet disposed normal to said plane and having said mounting surface on the outside thereof, said plate also comprising first and second side tabs on longitudinally opposite sides of said second pivot connection to said plate and each projecting from said sheet parallel to said plane towards said base, and in which said first and second base-to-plate fastening means each comprises: an aperture formed in a respective one of said side tabs, a corresponding aperture formed in said base, and pin means adapted, when inserted in both said apertures, to pivotally coupled said base and plate, and, when removed from at least one such aperture to terminate that pivotal coupling.

7. A bracket according to claim 6 in which at least one of such two apertures of each such fastening means is in the form of a notch permitting sidewise insertion and removal of said pin means into and from, respectively, such notch aperture.

8. A bracket for mounting on the outside of a mobile home at least one component of a telephone lead-in connection for said home, said bracket comprising, a base for said bracket comprising a longitudinally extending web disposed in a longitudinal-transverse plane and comprising, also, a longitudinally extending flange projecting outward from the upper side of said web in normal relation to said plane so as to render said base of "L" shaped cross section over the length of said flange, a pair of beam clamps mounted on said base on its inside of its "L" cross section and adapted to fixedly secure said base to a structural part of said mobile home, an elongated bar having formed therein at its upper end a slot extending in the direction of the bar's elongation, a screw having a head greater in diameter than the width of said slot and having a stem passing therethrough into a longitudinally central part of said web, said screw, while loose, coupling said bar to said web so as to permit pivoting of said bar in such plane about said stem and adjustment of the distance between said stem and the lower end of said bar, and said screw being tightenable to lock said bar to said web, a longitudinally extending angularly tiltable mounting plate disposed below said base and having as parts thereof a flat sheet normal to said plane, a longitudinally central tab, and a pair of side tabs spaced from and on longitudinally opposite sides of said central tab, each of such tabs projecting outward from said sheet towards said base in parallel relation to said plane, and each of such side tabs having a notch extending thereinto from the longitudinally inner edge of such tab, a pivot pin coupling the lower end of said bar to said central tab of said plate, and a pair of pin means carried by said web to be longitudinally spaced from, and on opposite sides of, said central part of said web, each of said pin means being selectably insertable into and removable from the notch of a respective one of said side tabs of said plate so as, thereby, to establish and terminate, respectively, a pivot connection through such pin means and side tab between said base and plate.

* * * * *